United States Patent
Skalicky et al.

(10) Patent No.: US 9,720,091 B2
(45) Date of Patent: Aug. 1, 2017

(54) ADAPTIVE SATELLITE SEARCH SUCCESSION

(71) Applicant: Honeywell International Inc., Morristown, NJ (US)

(72) Inventors: Jakub Skalicky, Brno (CZ); Jussi Raasakka, Brno (CZ); Martin Orejas, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 504 days.

(21) Appl. No.: 14/319,572

(22) Filed: Jun. 30, 2014

(65) Prior Publication Data

US 2015/0378024 A1 Dec. 31, 2015

(51) Int. Cl.
*G01S 19/13* (2010.01)
*G01S 19/28* (2010.01)

(52) U.S. Cl.
CPC .............. *G01S 19/13* (2013.01); *G01S 19/28* (2013.01)

(58) Field of Classification Search
CPC ................................ G01S 19/13; G01S 19/28
USPC ......................................... 342/357.65, 357.51
See application file for complete search history.

(56) References Cited

U.S. PATENT DOCUMENTS

| | | | |
|---|---|---|---|
| 6,583,759 B2 | 6/2003 | Pietila et al. | |
| 7,250,904 B2 | 7/2007 | King et al. | |
| 7,671,796 B2 | 3/2010 | Chen et al. | |
| 7,839,332 B2 | 11/2010 | Chen | |
| 7,852,263 B2 | 12/2010 | Henkel et al. | |
| 7,944,395 B1* | 5/2011 | Curticapean | G01S 19/07 342/357.65 |
| 7,973,708 B2 | 7/2011 | Lee et al. | |
| 8,089,399 B2 | 1/2012 | Alizadeh-Shabdiz | |

(Continued)

FOREIGN PATENT DOCUMENTS

| EP | 0428827 | 5/1991 |
|---|---|---|
| EP | 1186905 A2 | 3/2002 |

(Continued)

OTHER PUBLICATIONS

European Patent Office, "Extended European Search Report from EP Application No. 15170921.9 mailed Dec. 7, 2015", "from Foreign Counterpart of U.S. Appl. No. 14/319,572", Dec. 7, 2015, pp. 16, Published in: EP.

(Continued)

*Primary Examiner* — Harry Liu
(74) *Attorney, Agent, or Firm* — Fogg & Powers LLC (57) ABSTRACT

A global navigation satellite system (GNSS) receiver includes a processor to determine whether a first satellite is in view of GNSS receiver; whether a second satellite is in view of GNSS receiver when first satellite is in view of GNSS receiver; and whether a third satellite is in view of GNSS receiver when first satellite is not in view of GNSS receiver. Second satellite was previously determined more likely to be in view when first satellite is in view based on a first average distance between first satellite and second satellite based on a first orbit of first satellite and a second orbit of second satellite. Third satellite was previously determined more likely to be in view when first satellite is not in view based on a second average distance between first satellite and third satellite based on first orbit of first satellite and a third orbit of third satellite.

14 Claims, 5 Drawing Sheets

(56) References Cited

U.S. PATENT DOCUMENTS

2006/0077096 A1\* 4/2006 King ............. G01S 19/28
                                           342/357.67
2007/0229351 A1 10/2007 Chen et al.
2012/0249369 A1 10/2012 Pon

FOREIGN PATENT DOCUMENTS

| EP | 1186905 B1 | 1/2009 |
|---|---|---|
| FI | 109840 B | 10/2002 |
| RU | 2318221 | 2/2008 |

OTHER PUBLICATIONS

Chen, "A Dynamic Satellite Search Scheduling for GNSS Super Constellation", "ION GNSS 21st International Technical Meeting of the Satellite Division", Sep. 16-19, 2008, pp. 212-220.

Couronneau et al., "Calculating Time-to-First-Fix: GPS World", "Retrieved May 13, 2014 from Internet http://gpsworld.com/wirelessinfrastructurecalculating-time-first-fix-12258/", Nov. 1, 2011, pp. 1-11, Publisher: GPS World.

Wu et al., "A Quick Location Method for High Dynamic GNSS Receiver Based on Time Assistance", "Int J Comput Commun, ISSN 1841-9836", Oct. 2013, pp. 754-759, Publisher: CCC Publications.

\* cited by examiner

FIG. 5

# ADAPTIVE SATELLITE SEARCH SUCCESSION

BACKGROUND

Performing Global Navigation Satellite System (GNSS) receiver acquisition without knowledge of current time, receiver's position, and satellite's almanac can require a significant amount of time. The reason for this is that all satellites from a given constellation must be searched as it is not possible to know in advance which satellites are visible. The advent of future multi-constellation receivers (capable of processing signals form several constellations like GPS, GLONASS, Galileo, and Beidou) will make this task even more demanding. In addition, most new signals (like GPS L5 and Galileo E1) have longer primary codes which translate directly into longer search time per satellite.

In many applications, a key performance indicator of the GNSS receiver is the time required to acquire enough satellites to obtain a position fix, usually called Time to First Fix (TTFF). Thus, it is desirable to reduce the time to first fix as much as possible.

SUMMARY

A global navigation satellite system receiver includes a processor configured to determine whether a first satellite is in view of the global navigation satellite system receiver. The processor is further configured to determine whether a second satellite is in view of the global navigation satellite system receiver when the first satellite is determined to be in view of the global navigation satellite system receiver. The processor is further configured to determine whether a third satellite is in view of the global navigation satellite system receiver when the first satellite is not determined to be in view of the global navigation satellite system receiver. The second satellite was previously determined to be more likely to be in view when the first satellite is determined to be in view based on a first average distance between the first satellite and the second satellite based on a first orbit of the first satellite and a second orbit of the second satellite. The third satellite was previously determined to be more likely to be in view when the first satellite is not determined to be in view based on a second average distance between the first satellite and the third satellite based on the first orbit of the first satellite and a third orbit of the third satellite.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In exemplary embodiments, Global Navigation Satellite Systems (GNSS) described herein include the United States' Global Positioning System (GPS) and Wide Area Augmentation System (WAAS), Russia's Global'naya Navigatsionnaya Sputnikovaya Sisterna (GLONASS), China's Beidou and Compass, the European Union's Galileo and European Geostationary Navigation Overlay Service (EGNOS), India's Indian Regional Navigational Satellite System (IRNSS), and Japan's Quasi-Zenith Satellite System (QZSS). In exemplary embodiments implementing GPS, L1 signals (operating around 1.57542 GHz) and/or L2 signals (operating around 1.2276 GHz) and/or L5 signals (operating around 1.17645 GHz) are implemented. In exemplary embodiments implementing GLONASS, SP signals at a first frequency (operating around 1.602 GHz) and/or SP signals at a second frequency (operating around 1.246 GHz) are implemented. In exemplary embodiments implementing COMPASS, B1 signals (operating around 1.561098 GHz), B1-2 signals (operating around 1.589742), B2 signals (operating around 1.20714 GHz) and/or B3 signals (operating around 1.26852 GHz) are implemented. In exemplary embodiments implementing Galileo, E5a and E5b signals (operating around 1.164-1.215 GHz), E6 signals (operating around 1.260-1.300 GHz), and/or E2-L1-E11 signals (operating around 1.559-1.592 GHz) are implemented.

In exemplary embodiments of applications that do not need to provide integrity monitoring, a position fix can be achieved with just four satellites. In exemplary embodiments of applications that are required to provide integrity monitoring, at least five satellites should be acquired to obtain a position fix. In other embodiments, greater or fewer satellites are required to obtain a position fix. This invention reduces the Time to First Fix (TTFF) by adaptively selecting the search order of the satellites to select those that are most likely to be in view of the GNSS receiver. In exemplary embodiments, to reduce the time required to acquire the satellites in view (in particular the satellites needed to perform a position fix), the order in which the respective satellites are searched for is optimized. Earlier systems perform the satellite search sequentially. In some earlier implementations using pseudo-random noise (PRN) sequences, a satellite having a first pseudo-random noise sequence PRN 1 is searched for first, then a satellite having a second pseudo-random noise sequence PRN 2, then a satellite having a third pseudo-random noise sequence PRN 3, etc. This sequential search algorithm is less efficient because it does not take advantage of any prior knowledge of the constellation's geometry.

The constellation's relative geometry is public and subject to very minor changes in time (the most prominent changes being the deployment of new satellites). Accordingly, this relative geometry can be used to select which satellite to search for next based on whether or not a particular satellite is more expected to be in view. The likelihood that the other satellites are in view when a particular satellite is in view can be estimated using heuristic methods described herein. Similarly, the likelihood that the other satellites are in view when a particular satellite is not determined to be in view can be estimated using the heuristic methods described herein. Accordingly, an intelligent search can be performed with the knowledge of which satellites have already been searched and whether or not those satellites were in view. Each attempt at finding a satellite, whether successful or not, gives more information about which satellite to choose next. Thus, it is possible to adaptively change the order in which the satellites are searched.

In exemplary embodiments, the function that decides which satellite to search for next is based on a matrix describing how the satellites are mutually distinct. In exemplary embodiments, this matrix indicates an estimated likelihood that each of the other satellites is in view if the particular satellite is determined to be in view. In exemplary embodiments, a second matrix derived from the first matrix indicates an estimated likelihood that each of the other satellites is in view if the particular satellite is determined not to be in view. In exemplary embodiments, the estimated likelihood is a heuristic value derived by averaging the distances between the two satellites over a period of time, such as 12 hours or one day, and normalizing this value with respect to the mean orbital diameter. In exemplary embodiments, the mean orbital radius is used. In exemplary embodiments, the satellite locations and associated distances are sampled approximately 100 times during the 12 hours or one day. In exemplary embodiments, the distances at each sample can be between zero and approximately 52,000 km, which is the maximum distance between satellites. In other exemplary embodiments, these distances can be different. In exemplary embodiments, these matrices are computed prior to use in a satellite search, thus greatly reducing the computational load of the algorithm.

While the methodology described herein does not provide deterministic results and may not always lead to a successful acquisition of a subsequent satellite after a particular satellite, it is more likely to lead to one. The methodology described herein is also computationally efficient, while yielding substantial improvement over previously used satellite acquisition search methodologies.

Figure 1:
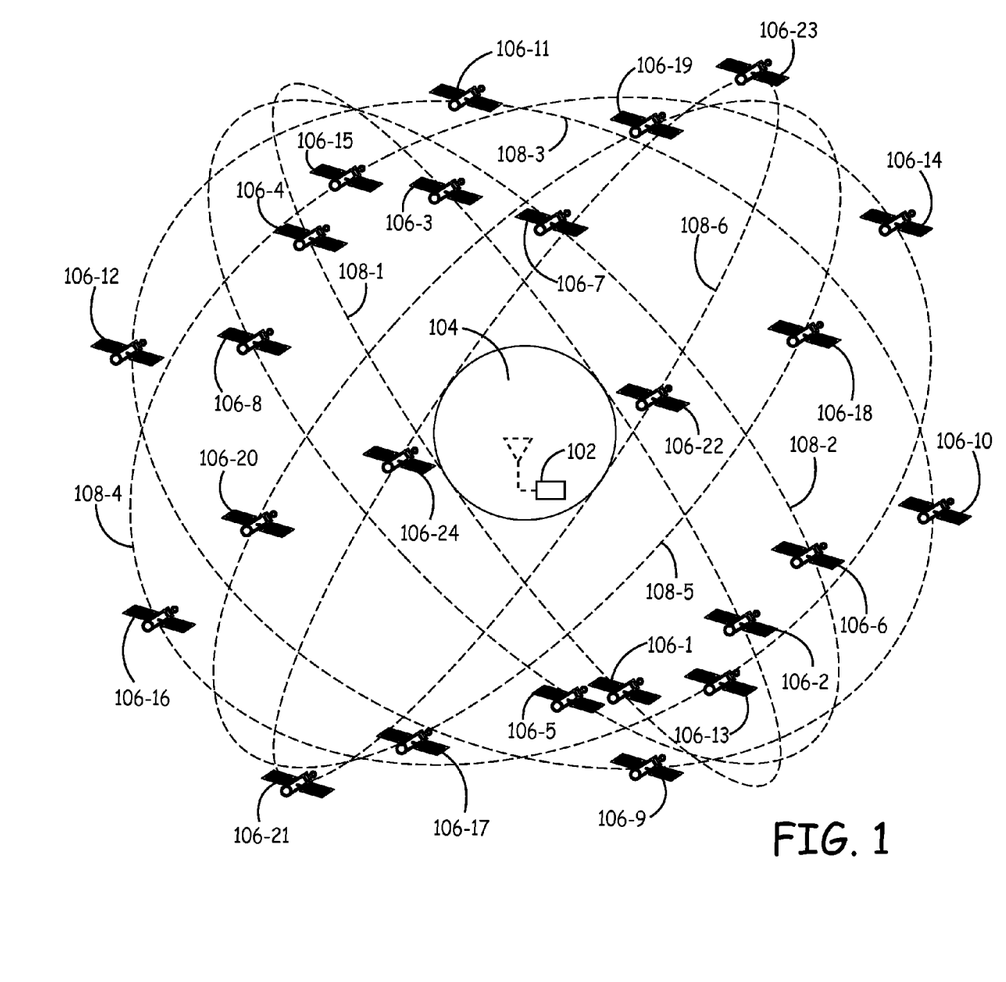
FIG. 1 is a block diagram of an exemplary embodiment of a global navigation satellite system (GNSS) receiver positioned at some location on Earth and configured to use a plurality of GNSS satellites having a plurality of orbits around Earth to determine coordinates of its location.

FIG. 1 is a block diagram of an exemplary embodiment of a global navigation satellite system (GNSS) receiver 102 positioned at some location at Earth 104 (or some other planet, planetoid, etc. having a GNSS system) and configured to use a plurality of GNSS satellites 106 (including any of GNSS satellite 106-1, GNSS satellite 106-2, GNSS satellite 106-3, GNSS satellite 106-4, GNSS satellite 106-5, GNSS satellite 106-6, GNSS satellite 106-7, GNSS satellite 106-8, GNSS satellite 106-9, GNSS satellite 106-10, GNSS satellite 106-11, GNSS satellite 106-12, GNSS satellite 106-13, GNSS satellite 106-14, GNSS satellite 106-15, GNSS satellite 106-16, GNSS satellite 106-17, GNSS satellite 106-18, GNSS satellite 106-19, GNSS satellite 106-20, GNSS satellite 106-21, GNSS satellite 106-22, GNSS satellite 106-23, and GNSS satellite 106-24) each having a GNSS satellite orbit 108 (including any of GNSS satellite orbit 108-1, GNSS satellite orbit 108-2, GNSS satellite orbit 108-3, GNSS satellite orbit 108-4, GNSS satellite orbit 108-5, GNSS satellite orbit 108-6, and any quantity of additional GNSS satellite orbits 108 not shown) to determine coordinates of the location of the GNSS receiver 102. While 24 GNSS satellites 106 having six distinct GNSS orbits 108 are shown in FIG. 1, it is understood that other embodiments include greater or fewer GNSS satellites 106 and/or greater or fewer GNSS satellite orbits 108. It is further understood that in some implementations, the GNSS satellites 108 are from more than one GNSS constellation.

In exemplary embodiments, the GNSS satellite orbits 108 of the GNSS satellites 106 are substantially constant relative to each other. In exemplary embodiments, four GNSS satellites 106 are spaced along each GNSS satellite orbit 108 such that a first pair of the four GNSS satellites 106 are substantially opposite one another in the GNSS satellite orbit 108 and a second pair of the four GNSS satellites 106 are substantially opposite one another in the GNSS satellite orbit 108. In exemplary embodiments, the pairs of GNSS satellites 106 that are substantially opposite one another are considered to be "counterparts". In exemplary implementations, GNSS satellite orbit 108-1 includes GNSS satellite 106-1 substantially opposite GNSS satellite 106-3 and GNSS satellite 106-2 substantially opposite GNSS satellite 106-4. Similarly, GNSS satellite orbit 108-2 includes GNSS satellite 106-5 substantially opposite GNSS satellite 106-7 and GNSS satellite 106-6 substantially opposite GNSS satellite 106-8. Similarly, GNSS satellite orbit 108-3 includes GNSS satellite 106-9 substantially opposite GNSS satellite 106-11 and GNSS satellite 106-10 substantially opposite GNSS satellite 106-12. Similarly, GNSS satellite orbit 108-4 includes GNSS satellite 106-13 substantially opposite GNSS satellite 106-15 and GNSS satellite 106-14 substantially opposite GNSS satellite 106-16. Similarly, GNSS satellite orbit 108-5 includes GNSS satellite 106-17 substantially opposite GNSS satellite 106-19 and GNSS satellite 106-18 substantially opposite GNSS satellite 106-20. Similarly, GNSS satellite orbit 108-6 includes GNSS satellite 106-21 substantially opposite GNSS satellite 106-23 and GNSS satellite 106-22 substantially opposite GNSS satellite 106-24.

Accordingly, the GNSS satellites 106 and/or GNSS satellite orbits 108 of the GNSS satellites 106 in the GNSS constellation have a relative geometry to one another. The relative geometry of the GNSS satellites 106 and/or GNSS satellite orbits 108 are only subject to minor changes in time. In exemplary embodiments, the largest changes in the relative geometry of the GNSS satellites 106 and/or GNSS satellite orbits 108 come when a new GNSS satellite 106 is deployed into the GNSS constellation.

In exemplary embodiments, the orbital parameters of the GNSS satellite orbits 108 are known from at least one of an ephemeris or an almanac. In other embodiments, different methods can be used to obtain the orbital parameters. In exemplary embodiments, a certain period of time is sampled at regular time intervals for each GNSS satellite 106 in the GNSS constellation and the position of each GNSS satellite 106 at the sampled time intervals is computed. In exemplary embodiments, for each pair of distinct GNSS satellites 106, the distance between them at the various time intervals is computed and averaged to obtain an average distance between each pair of distinct GNSS satellites 106.

In exemplary embodiments, the average distances between each pair of distinct GNSS satellites 106 are used to create a heuristic value for each combination. In other embodiments, different parameters like, the variance or Root Mean Square (RMS) values, can also be used to create the heuristic value for each combination. In exemplary embodiments, the average distance value between each pair of GNSS satellites 106 is subtracted from the satellite orbit mean diameter (Ds, which is the aforementioned approximately 52,000 km in some implementations) and result is divided by the satellite orbit mean diameter (Ds). In exemplary embodiments, each GNSS satellite 106 will have a normalized heuristic value indicating, on average, how close it is to each of the other GNSS satellites 106. In exemplary embodiments, each GNSS satellite 106 will have a heuristic value of one with itself and could potentially have a heuristic value of zero with a counterpart GNSS satellite 106 if it were exactly opposite to it all the time. For example, GNSS satellite 106-1 has a heuristic value of one with itself and it has a heuristic value near zero with counterpart GNSS satellite 106-3.

In exemplary embodiments, the heuristic values are stored in a matrix that identifies the heuristic values between all satellites based on the average distances sampled at the various times over a time period. In exemplary embodiments, the heuristic values are stored in a matrix. In exemplary implementations, the matrix is a symmetric matrix with n columns and n rows, where n is the number of satellites and the heuristic values stored in each spot in the matrix are valued between 0 and 1. In exemplary implementations, the larger the heuristic value, the closer the satellites are on average and the more likely they are in view at the same time. In exemplary embodiments, this matrix is recomputed periodically each time a new set of ephemeris and/or almanac is obtained (which could be every couple of days in some implementations). In exemplary embodiments, the matrix is only recomputed if the new ephemeris and/or almanac differs significantly from the previous one. In exemplary implementations, the parameter changes can be compared with their previous values to determine whether they differ from the previous values by more than a particular threshold.

Figure 2:
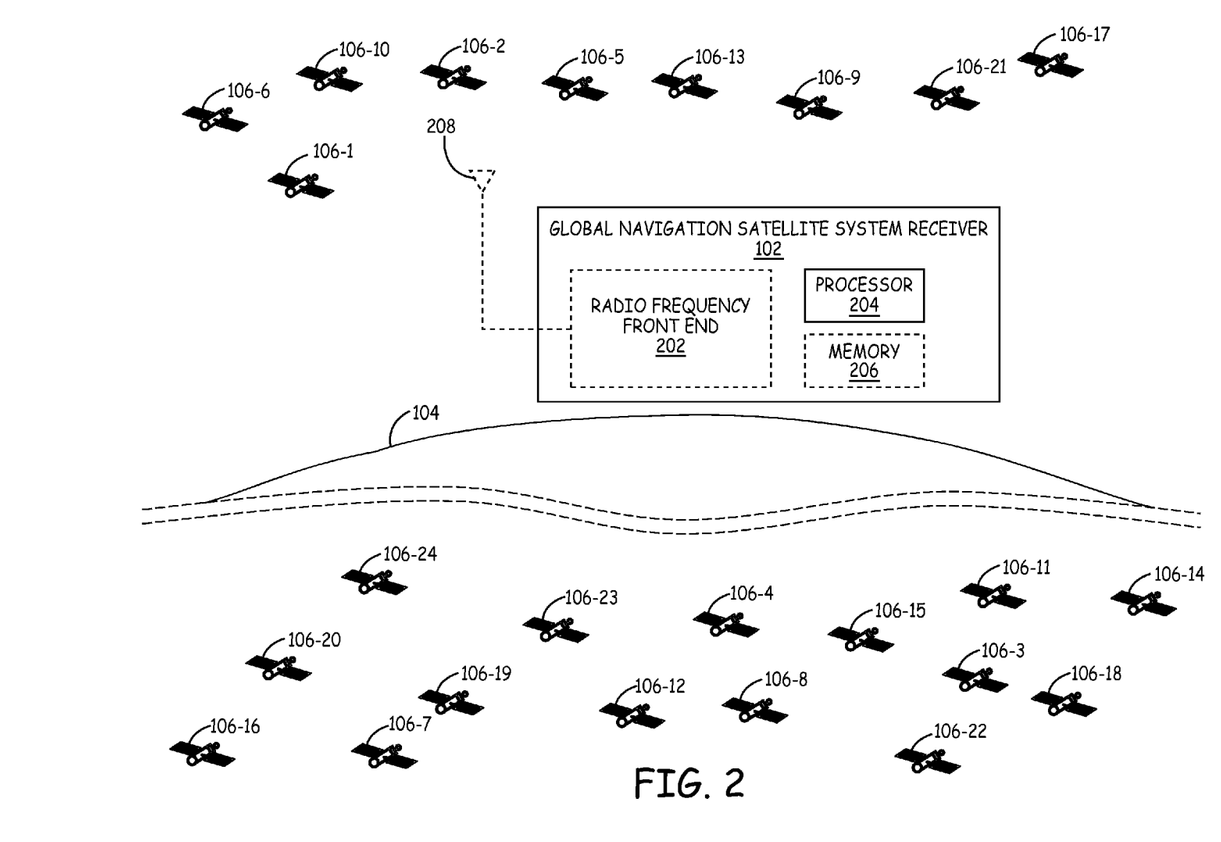
FIG. 2 is a block diagram of the exemplary embodiment of the GNSS system of FIG. 1 showing the plurality of satellites each having an orbit, where a subset of the plurality of satellites are within view and a subset of the plurality of satellites are not within view.

FIG. 2 is a block diagram of the exemplary embodiment of the GNSS receiver 102 showing the plurality of GNSS satellites 106, each having a GNSS satellite orbit 108. FIG. 2 shows that only a first subset of the plurality of GNSS satellites 106 (including GNSS satellite 106-1, GNSS satellite 106-2, GNSS satellite 106-5, GNSS satellite 106-6, GNSS satellite 106-9, GNSS satellite 106-10, GNSS satellite 106-13, GNSS satellite 106-17, and GNSS satellite 106-21) are in view, while a second subset of the plurality of GNSS satellites 106 (including GNSS satellite 106-3, GNSS satellite 106-4, GNSS satellite 106-7, GNSS satellite 106-8, GNSS satellite 106-11, GNSS satellite 106-12, GNSS satellite 106-14, GNSS satellite 106-15, GNSS satellite 106-16, GNSS satellite 106-18, GNSS satellite 106-19, GNSS satellite 106-20, GNSS satellite 106-22, GNSS satellite 106-23, and GNSS satellite 106-24) are not in view because they are obscured behind the curvature of the Earth 104, blocked by an object such as a mountain or structure, or are blocked in some other way.

In exemplary embodiments, GNSS Receiver 102 includes an optional radio frequency front end 202, a processor 204, and an optional memory 206. In exemplary embodiments, the radio frequency front end 202 of the GNSS receiver 102 is communicatively coupled to an antenna 208 that receives signals from the in-view GNSS satellites 106. In exemplary embodiments, the radio frequency front end is configured to perform analog processing, automatic gain adjustment of the analog signal, and/or analog to digital conversion of the GNSS signals received from the in-view GNSS satellites 106.

In exemplary embodiments, processor 204 includes or functions with software programs, firmware or other computer readable instructions for carrying out various methods, process tasks, calculations, and control functions, used in the functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk - Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the processor 204 is configured to receive a digital GNSS signal from the optional radio frequency front end 202. In exemplary embodiments, the processor 204 is further configured to determine whether a first GNSS satellite 106 (such as GNSS satellite 106-1) is in view of the global navigation satellite system receiver. In exemplary embodiments, the processor 204 is configured to choose which GNSS satellite 106 to look for next based on whether or not the first GNSS satellite 106 is determined to be in view. If the first GNSS satellite 106 (such as GNSS satellite 106-1) is determined to be in view, then the processor 204 is configured to search for the GNSS satellite 106 (such as GNSS satellite 106-2, GNSS satellite 106-5, etc.) having the highest heuristic value with respect to the first GNSS satellite 106. In contrast, if the first GNSS satellite 106 (such as GNSS satellite 106-1) is determined to not be in view, then the processor 204 is configured to search for the GNSS satellite 106 (such as GNSS satellite 106-3) having the lowest heuristic value with respect to the first GNSS satellite 106. In exemplary embodiments, the heuristic values are stored in a matrix in the optional memory 206.

Accordingly in exemplary embodiments, the processor 204 is further configured to determine whether a second GNSS satellite 106 (such as GNSS satellite 106-2, GNSS satellite 106-5, etc.) having a higher heuristic value with the first GNSS satellite 106 (such as GNSS satellite 106-1) is in view when the first GNSS satellite 106 (such as GNSS satellite 106-1) is determined to be in view of the GNSS receiver 102. In contrast in exemplary embodiments, the processor 204 is further configured to determine whether a third GNSS satellite 106 (such as GNSS satellite 106-3) having a lower heuristic value with the first GNSS satellite 106 (such as GNSS satellite 106-1) is determined to be in view of the GNSS receiver 102. In exemplary embodiments, information about whether or not a GNSS satellite 106 is in view is used to update the heuristic values so that information about each search for each satellite is used to further tailor the search order. In exemplary implementations, a GNSS satellite 106 with a maximum heuristic value with a current GNSS satellite 106 is selected when the current GNSS satellite 106 is determined to be in view and a GNSS satellite 106 with a minimum heuristic value with the current GNSS satellite 106 is selected when the current GNSS satellite 106 is determined not to be in view. In other implementations, it is understood that a GNSS satellite with a higher, but not maximum, heuristic value with a current GNSS satellite 106 is selected when the current GNSS satellite 106 is determined to be in view and a GNSS satellite 106 with a lower, but not minimum, heuristic value with the current GNSS satellite 106 is selected when the current GNSS satellite 106 is determined not to be in view. In this way, the processor 204 dynamically selects which GNSS satellite 106 to search for next in a logical way, resulting in quicker acquisition of the in-view GNSS satellites 106.

In exemplary embodiments, processor 204 continues iteratively to decide which satellite to try next based on the heuristic values. For example, in each iteration a particular GNSS satellite 106 is tried based on whether or not another GNSS satellite 106 was found to be in view in the previous iteration. In exemplary implementations, knowledge about which satellites have already been tried is used to avoid attempting to acquire a satellite that was already tried in a previous iteration.

In exemplary implementations, a metrics vector of length n (where n is the number of satellites) is initialized at startup with all ones. The set of candidates is the full list of GNSS satellites 106. One of the GNSS satellites 106 is selected and the GNSS receiver 102 attempts to acquire the selected GNSS satellite 106. A first row of the heuristic metrics matrix contains information on average distances of all the other GNSS satellites 106 from the selected GNSS satellite 106. In exemplary implementations, if the selected GNSS satellite 106 is acquired (meaning it is "in view"), the metrics vector is multiplied by the first row of the heuristics metrics matrix. In contrast, if the selected GNSS satellite 106 is not acquired (meaning it is not "in view"), the metric vector is multiplied by 1 minus the first row of the heuristics metrics matrix. In exemplary implementations, the metric is manually set to zero for the first selected GNSS satellite 106 to avoid looping. In exemplary implementations, after the entire search space is covered and all the satellites are searched for, the list is reset not to include satellites already acquired and the metric is initialized to the product of the rows corresponding to the acquired satellites.

In exemplary embodiments, the processor 204 is further configured to generate the heuristic values by sampling the distances between the GNSS satellites 106 over a time interval and averaging the distances between every pair of GNSS satellites 106. In exemplary embodiments, the average distances between each pair are further adjusted and/or normalized between 0 and 1 to create the heuristic values. In other implementations, the average distances between pairs are used directly as the heuristic values or used in other ways to intelligently select which satellite to search for next based on whether or not a particular satellite is determined to be in view.

Figure 3:
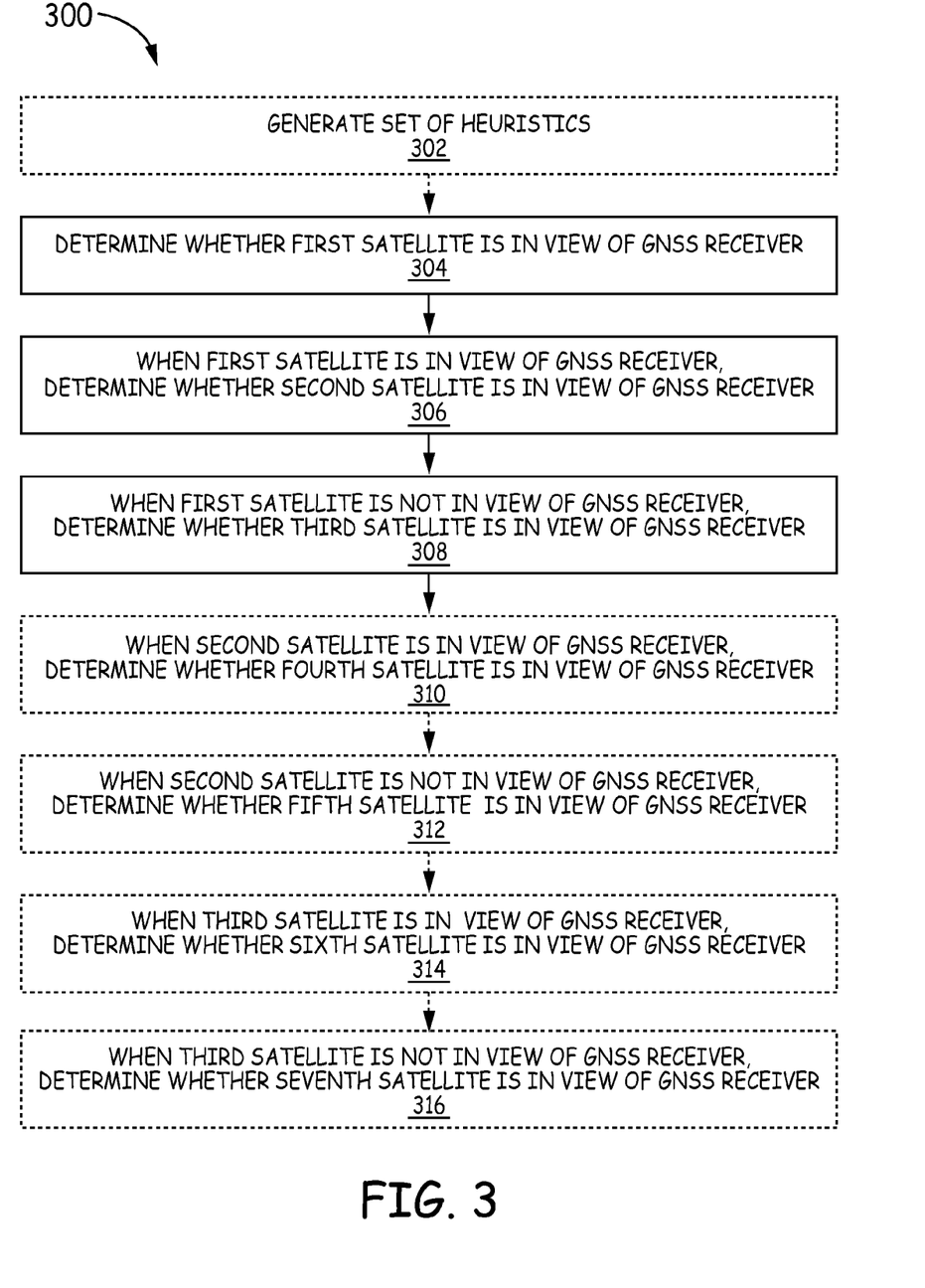
FIG. 3 is a flow diagram illustrating one exemplary embodiment of a method of performing a global navigation satellite system search.

FIG. 3 is a flow diagram illustrating one exemplary embodiment of a method 300 of performing a global navigation satellite system search. Method 300 begins at optional block 302 with generating a set of heuristics. Method 300 proceeds to block 304 with determining whether a first satellite is in view of a GNSS receiver. Method 300 proceeds to block 306 with when the first satellite is determined to be in view of the GNSS receiver, determining whether a second satellite is in view of the GNSS receiver. Method 300 proceeds to block 308 with when the first satellite is not determined to be in view of the GNSS receiver, determining whether a third satellite is in view of the GNSS receiver.

Method 300 proceeds to optional block 310 with when the second satellite is determined to be in view of the GNSS receiver, determining whether a fourth satellite is in view of the GNSS receiver. Method 300 proceeds to optional block 312 with when the second satellite is not determined to be in view of the GNSS receiver, determining whether a fifth satellite is in view of the GNSS receiver. Method 300 proceeds to optional block 314 with when the third satellite is determined to be in view of the GNSS receiver, determining whether a sixth satellite is in view of the GNSS receiver. Method 300 proceeds to optional block 316 with when the third satellite is not determined to be in view of the GNSS receiver, determining whether a seventh satellite is in view of the GNSS receiver.

In exemplary embodiments, the first satellite and the second satellite share a first orbital path. In exemplary embodiments, the first satellite is substantially opposite the third satellite in the first orbital path. In other exemplary embodiments, the first satellite is adjacent to the second satellite in the first orbital path. In other exemplary embodiments, the first satellite and the second satellite do not share a first orbital path. In exemplary embodiments, the first average distance between the first satellite and the second satellite was previously determined by computing a first set of positions of the first satellite at a set of time intervals over the orbital period and a second set of positions of the second satellite at the set of time intervals over the orbital period. In exemplary embodiments, the second average distance between the first satellite and the third satellite was previously determined by computing the first set of positions of the first satellite at the time intervals over the orbital period and a third set of positions of the third satellite at the set of time intervals over the orbital period.

In exemplary embodiments, the method further includes determining whether a fourth satellite is in view of the global navigation satellite system receiver when the second satellite is determined to be in view of the global navigation satellite system receiver. In exemplary embodiments, the fourth satellite was previously determined to be more likely to be in view when the second satellite is determined to be in view based on a third average distance between the second satellite and the fourth satellites based on the second orbit of the second satellite and a fourth orbit of the fourth satellite. In exemplary embodiments, the method further includes determining whether a fifth satellite is in view of the global navigation satellite system receiver when the second satellite is not determined to be in view of the global navigation satellites system receiver. In exemplary embodiments, the fifth satellite was previously determined to be more likely to be in view when the second satellite is not determined to be in view based on a fourth average distance between the second satellite and the fifth satellite based on the second orbit of the second satellite and a fifth orbit of the fifth satellite.

In exemplary embodiments, the method further includes determining whether a sixth satellite is in view of the global navigation satellites system receiver when the third satellite is determined to be in view of the global navigation satellite system receiver. In exemplary embodiments, the sixth satellite was previously determined to be more likely to be in view when the third satellite is determined to be in view based on a fifth average distance between the third satellite and the sixth satellite based on the orbit of the third satellite and a sixth orbit of the sixth satellite. In other exemplary embodiments, the method further includes determining whether a seventh satellite is in view of the global navigation satellite system receiver when the third satellite is not determined to be in view of the global navigation satellite system receiver. In exemplary embodiments, the seventh satellite was previously determined to be more likely to be in view when the third satellite is not determined to be in view based on a sixth average distance between the third satellite and the seventh satellite based on the third orbit of the third satellite and a seventh orbit of the seventh satellite.

In exemplary embodiments, the method further includes generating a set of heuristics prior to determining whether a first satellite is in view of the global navigation satellite system receiver. In exemplary embodiments, the heuristics indicate that the second satellite is more likely to be in view when the first satellite is determined to be in view based on the first average distance between the first satellite and the second satellite based on the first orbit of the first satellite and the second orbit of the second satellite. In exemplary embodiments, the heuristics indicate that the third satellite is more likely to be in view when the first satellite is not determined to be in view based on the second average distance between the first satellite and the third satellite based on the first orbit of the first satellite and the third orbit of the third satellite.

Figure 4:
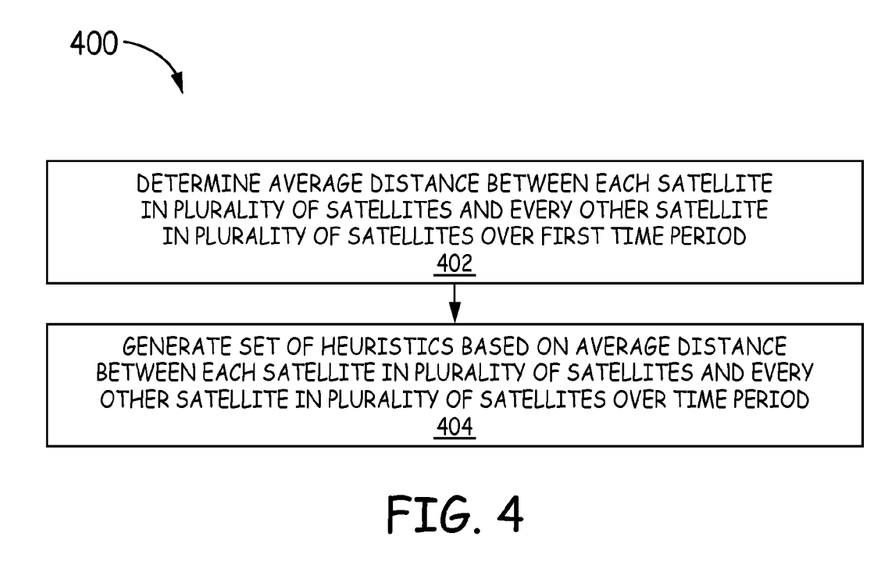
FIG. 4 is a flow diagram illustrating one exemplary embodiment of a method of generating a heuristic.

FIG. 4 is a flow diagram illustrating one exemplary embodiment of a method 400 of generating a heuristic. Method 400 could be used to implement optional block 302 in method 300. Method 400 begins at optional block 402 with determining an average distance between each GNSS satellite in a plurality of satellites and every other satellite in the plurality of satellites over a first time period. Method 400 proceeds to block 404 with generating a set of heuristics based on the average distance between each individual satellite in the plurality of satellites and every other satellite in the plurality of satellites over the first time period. In exemplary embodiments, the set of heuristics indicate for each individual satellite within the plurality of satellites how likely the other satellites are to be in view when the individual satellite is within view. In exemplary embodiments, the set of heuristics includes a matrix with heuristic values. In exemplary embodiments, the set of heuristics is updated based on information about whether or not satellites are in view.

Figure 5:
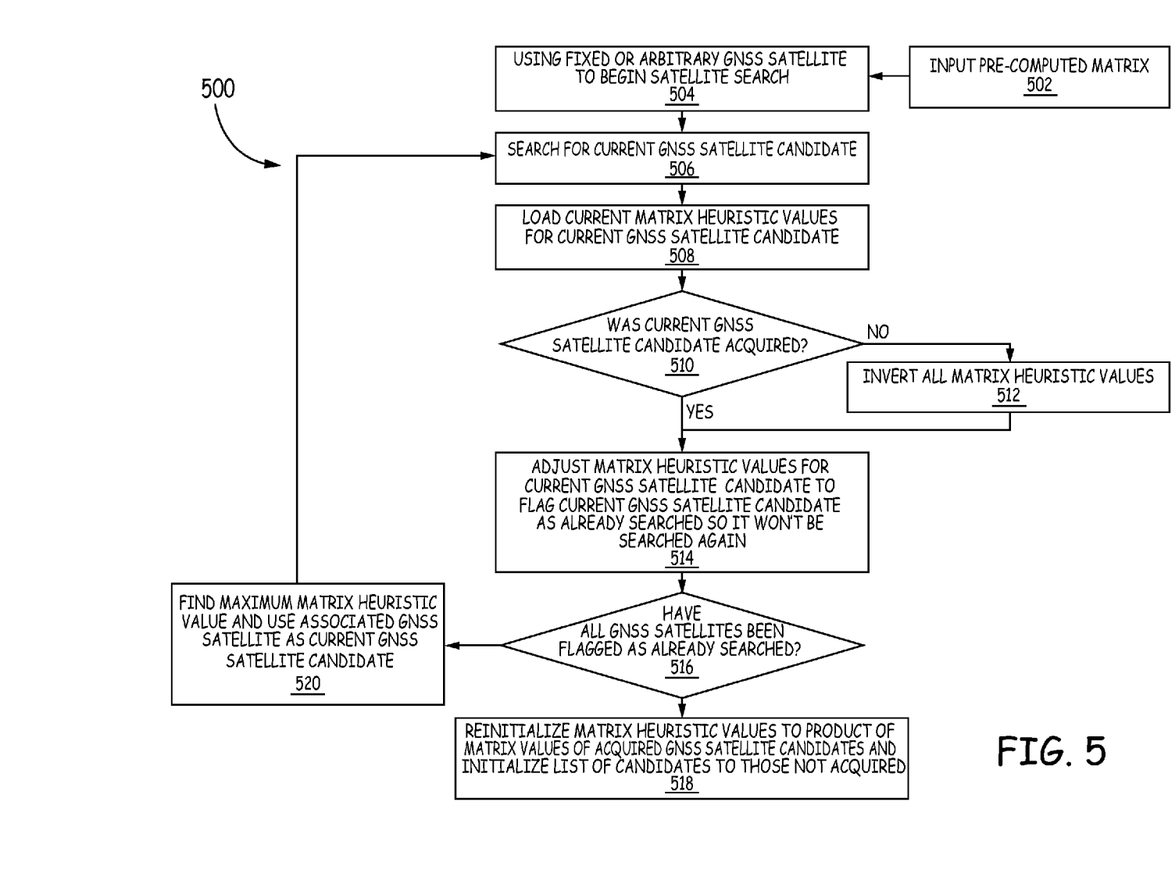
FIG. 5 is a flow diagram illustrating another exemplary embodiment of a method of performing a global navigation satellite system search.

FIG. 5 is a flow diagram illustrating another exemplary embodiment of a method 500 of performing a global navigation satellite system search. Method 500 begins at block 502 with inputting a pre-computed matrix 502 into the system. In exemplary embodiments, the pre-computed matrix includes a set of heuristics for each GNSS satellite candidate. Method 500 proceeds to block 504 with using a fixed or arbitrary GNSS satellite to begin a satellite search. Method 500 proceeds to block 506 with searching for a current GNSS satellite candidate 506. Method 500 proceeds to block 508 with loading current matrix heuristic values for the current GNSS satellite candidate.

Method 500 proceeds to block 510 with determining whether the current GNSS satellite candidate was acquired. If the current GNSS satellite candidate was not acquired, method 500 proceeds to block 512 with inverting all matrix heuristic values 512. In exemplary embodiments, this is done by simply subtracting the current matrix from one because all matrix heuristic values lie between zero and one. In other embodiments, this is done in other ways. Method 500 proceeds from block 512 to block 514 with adjusting the matrix heuristic values for the current GNSS satellite candidate to flag the current GNSS satellite candidate as already searched so it won't be searched again. If the current GNSS satellite candidate was acquired, method 500 proceeds from block 510 directly to block 514 with adjusting the matrix heuristic values for the current GNSS satellite candidate to flag the current GNSS satellite candidate as already searched so it won't be searched again without inverting all matrix heuristic values 512. In this way, data from both found and not found satellites is used to update the matrix heuristic values to enable an optimized search.

Method 500 proceeds from block 514 to block 516 with determining whether all GNSS satellites have been flagged as already searched. If all GNSS satellites have been flagged as already searched, method 500 proceeds to block 518 with reinitializing matrix heuristic values to product of matrix values of acquired GNSS satellite candidates and initialize list of candidates to those not acquired. If all GNSS satellites have not been flagged as already searched, method 500 proceeds from block 516 to block 520 with finding the maximum matrix heuristic value and using the associated GNSS satellite as the current GNSS satellite candidate. Method 500 proceeds from block 520 to block 506 with searching for the current GNSS satellite candidate 506. In this way, the next GNSS satellite candidate that is searched for is selected in an optimized way based on the updated heuristic values in the matrix that is more likely to result in an acquisition.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a global navigation satellite system receiver comprising: a processor configured to determine whether a first satellite is in view of the global navigation satellite system receiver; wherein the processor is further configured to determine whether a second satellite is in view of the global navigation satellite system receiver when the first satellite is determined to be in view of the global navigation satellite system receiver; wherein the processor is further configured to determine whether a third satellite is in view of the global navigation satellite system receiver when the first satellite is not determined to be in view of the global navigation satellite system receiver; wherein the second satellite was previously determined to be more likely to be in view when the first satellite is determined to be in view based on a first average distance between the first satellite and the second satellite based on a first orbit of the first satellite and a second orbit of the second satellite; wherein the third satellite was previously determined to be more likely to be in view when the first satellite is not determined to be in view based on a second average distance between the first satellite and the third satellite based on the first orbit of the first satellite and a third orbit of the third satellite.

Example 2 includes the global navigation satellite system receiver of Example 1, wherein the first satellite and the second satellite share a first orbital path; and wherein the first satellite is substantially opposite the third satellite in the first orbital path.

Example 3 includes the global navigation satellite system receiver of any of Examples 1-2, wherein the first satellite and the second satellite do not share a first orbital path.

Example 4 includes the global navigation satellite system receiver of any of Examples 1-3, wherein the first satellite and the second satellite share a first orbital path; and wherein the first satellite is adjacent to the second satellite in the first orbital path.

Example 5 includes the global navigation satellite system receiver of any of Examples 1-4, wherein the first average distance between the first satellite and the second satellite was previously determined by computing a first set of positions of the first satellite at a set of time intervals over an orbital period and a second set of positions of the second satellite at the set of time intervals over the orbital period; and wherein the second average distance between the first satellite and the third satellite was previously determined by computing the first set of positions of the first satellite at the time intervals over the orbital period and a third set of positions of the third satellite at the set of time intervals over the orbital period.

Example 6 includes the global navigation satellite system receiver of any of Examples 1-5, further comprising: wherein the processor is further configured to determine whether a fourth satellite is in view of the global navigation satellite system receiver when the second satellite is determined to be in view of the global navigation satellite system receiver; wherein the processor is further configured to determine whether a fifth satellite is in view of the global navigation satellite system receiver when the second satellite is not determined to be in view of the global navigation satellite system receiver; wherein the fourth satellite was previously determined to be more likely to be in view when the second satellite is determined to be in view based on a third average distance between the second satellite and the fourth satellite based on the second orbit of the second satellite and a fourth orbit of the fourth satellite; and wherein the fifth satellite was previously determined to be more likely to be in view when the second satellite is not determined to be in view based on a fourth average distance between the second satellite and the fifth satellite based on the second orbit of the second satellite and a fifth orbit of the fifth satellite.

Example 7 includes the global navigation satellite system receiver of Example 6, further comprising: wherein the processor is further configured to determine whether a sixth satellite is in view of the global navigation satellite system receiver when the third satellite is determined to be in view of the global navigation satellite system receiver; wherein the processor is further configured to determine whether a seventh satellite is in view of the global navigation satellite system receiver when the third satellite is not determined to be in view of the global navigation satellite system receiver; wherein the sixth satellite was previously determined to be more likely to be in view when the third satellite is determined to be in view based on a fifth average distance between the third satellite and the sixth satellite based on the third orbit of the third satellite and a sixth orbit of the sixth satellite; and wherein the seventh satellite was previously determined to be more likely to be in view when the third satellite is not determined to be in view based on a sixth average distance between the third satellite and the seventh satellite based on the third orbit of the third satellite and a seventh orbit of the seventh satellite.

Example 8 includes the global navigation satellite system receiver of any of Examples 1-7, further comprising: wherein the processor is further configured to generate a set of heuristics prior to being configured to determine whether a first satellite is in view of the global navigation satellite system receiver; wherein the heuristics indicate that the second satellite is more likely to be in view when the first satellite is determined to be in view based on the first average distance between the first satellite and the second satellite based on the first orbit of the first satellite and the second orbit of the second satellite; and wherein the heuristics indicate that the third satellites is more likely to be in view when the first satellite is not determined to be in view based on the second average distance between the first satellite and the third satellite based on the first orbit of the first satellite and the third orbit of the third satellite.

Example 9 includes a method of global navigation satellite system search comprising: determining whether a first satellite is in view of a global navigation satellite system receiver; when the first satellite is determined to be in view of the global navigation satellite system receiver, determining whether a second satellite is in view of the global navigation satellite system receiver; when the first satellite is not determined to be in view of the global navigation satellite system receiver, determining whether a third satellite is in view of the global navigation satellite system receiver; wherein the second satellite was previously determined to be more likely to be in view when the first satellite is determined to be in view based on a first average distance between the first satellite and the second satellite based on a first orbit of the first satellite and a second orbit of the second satellite; and wherein the third satellite was previously determined to be more likely to be more likely to be in view when the first satellite is not determined to be in view based on a second average distance between the first satellite and the third satellite based on the first orbit of the first satellite and a third orbit of the third satellite.

Example 10 includes the method of Example 9, wherein the first satellite and the second satellite share a first orbital path; and wherein the first satellite is substantially opposite the third satellite in the first orbital path.

Example 11 includes the method of any of Examples 9-10, wherein the first satellite and the second satellite do not share a first orbital path.

Example 12 includes the method of any of Examples 9-11, wherein the first satellite and the second satellite share a first orbital path; and wherein the first satellite is adjacent to the second satellite in the first orbital path.

Example 13 includes the method of any of Examples 9-12, wherein the first average distance between the first satellite and the second satellite was previously determined by computing a first set of positions of the first satellite at a set of time intervals over an orbital period and a second set of positions of the second satellite at the set of time intervals over the orbital period; and wherein the second average distance between the first satellite and the third satellite was previously determined by computing the first set of positions of the first satellite at the time intervals over the orbital period and a third set of positions of the third satellite at the set of time intervals over the orbital period.

Example 14 includes the method of any of Examples 9-13, further comprising: when the second satellite is determined to be in view of the global navigation satellite system receiver, determining whether a fourth satellite is in view of the global navigation satellite system receiver; when the second satellite is not determined to be in view of the global navigation satellite system receiver, determining whether a fifth satellite is in view of the global navigation satellite system receiver; wherein the fourth satellite was previously determined to be more likely to be in view when the second satellite is determined to be in view based on a third average distance between the second satellite and the fourth satellite based on the second orbit of the second satellite and a fourth orbit of the fourth satellite; and wherein the fifth satellite was previously determined to be more likely to be in view when the second satellite is not determined to be in view based on a fourth average distance between the second satellite and the fifth satellite based on the second orbit of the second satellite and a fifth orbit of the fifth satellite.

Example 15 includes the method of any of Examples 9-14, further comprising: when the third satellite is determined to be in view of the global navigation satellite system receiver, determining whether a sixth satellite is in view of the global navigation satellite system receiver; when the third satellite is not determined to be in view of the global navigation satellite system receiver, determining whether a seventh satellite is in view of the global navigation satellite system receiver; wherein the sixth satellite was previously determined to be more likely to be in view when the third satellite is determined to be in view based on a fifth average distance between the third satellite and the sixth satellite based on the third orbit of the third satellite and a sixth orbit of the sixth satellite; and wherein the seventh satellite was previously determined to be more likely to be in view when the third satellite is not determined to be in view based on a sixth average distance between the third satellite and the seventh satellite based on the third orbit of the third satellite and a seventh orbit of the seventh satellite.

Example 16 includes the method of any of Examples 9-15, further comprising: generating a set of heuristics prior to determining whether a first satellite is in view of the global navigation satellite system receiver; wherein the heuristics indicate that the second satellite is more likely to be in view when the first satellite is determined to be in view based on the first average distance between the first satellite and the second satellite based on the first orbit of the first satellite and the second orbit of the second satellite; and wherein the heuristics indicate that the third satellite is more likely to be in view when the first satellite is not determined to be in view based on the second average distance between the first satellite and the third satellite based on the first orbit of the first satellite and the third orbit of the third satellite.

Example 17 includes a global navigation satellite system receiver comprising: a processor configured to determine an average distance between each individual satellite in a plurality of satellites and every other satellite in the plurality of satellites over a first time period; wherein the processor is further configured to generate a set of heuristics based on the average distance between each individual satellite in the plurality of satellites and every other satellite in the plurality of satellites over the first time period.

Example 18 includes the global navigation satellite system receiver of Example 17, wherein the set of heuristics indicate for each individual satellite within the plurality of satellites how likely the other satellites are to be in view when the individual satellite is within view.

Example 19 includes the global navigation satellite system receiver of any of Examples 17-18, wherein the set of heuristics includes a matrix with heuristic values.

Example 20 includes the global navigation satellite system receiver of any of Examples 17-19, wherein the set of heuristics is updated based on information about whether or not satellites are in view.

What is claimed is:

1. A global navigation satellite system receiver configured to receive signals from a plurality of global navigation satellite system satellites, the global navigation satellite system receiver comprising:
    a radio frequency front end communicatively coupled to an antenna and configured to receive radio frequency signals from in-view global navigation satellites system satellites from the plurality of global navigation satellite system satellites;
    a processor; and
    a memory storing a matrix including a set of estimated likelihood values for each of the plurality of global navigation satellite system satellites indicating estimated likelihoods that other global navigation satellite system satellites of the plurality of global navigation satellite system satellites are in view of the global navigation satellite system receiver when each of the plurality of global navigation satellite system satellites is in view;
    wherein the processor is configured to determine whether a candidate satellite of the plurality of global navigation satellite system satellites is in view of the global navigation satellite system receiver;
    wherein the processor is further configured to invert each of the estimated likelihood values within the matrix when the candidate satellite is not determined to be in view of the global navigation satellite system receiver;
    wherein the processor is further configured to adjust the estimated likelihood value for the candidate satellite to flag the candidate satellite as already searched; and
    wherein the processor is further configured to set the satellite of the plurality of global navigation satellite system satellites having a maximum estimated likelihood value as the next candidate satellite.

2. The global navigation satellite system receiver of claim 1, further comprising:
    wherein the processor is further configured to generate the matrix including the estimated likelihood values for each of the plurality of global navigation satellite system satellites prior to determining whether the candidate satellite is in view of the global navigation satellite system receiver.

3. The global navigation satellite system receiver of claim 1, wherein the estimated likelihood values are based on average distances between the plurality of global navigation satellite system satellites over a time period.

4. The global navigation satellite system receiver of claim 1, wherein the estimated likelihood values are based on average distances between the plurality of global navigation satellite system satellites over an orbital period.

5. The global navigation satellite system receiver of claim 4, wherein the average distances between the plurality of global navigation satellite system satellites were previously determined by computing positions of the plurality of global navigation satellite system satellites at time intervals over the orbital period.

6. A method of global navigation satellite system search comprising:
    receiving radio frequency signals from in-view global navigation satellites system satellites from a plurality of global navigation satellite system satellites at a radio frequency font end of a global navigation satellite system receiver;
    determining whether a candidate satellite of the plurality of global navigation satellite system satellites is in view of the global navigation satellite system receiver, wherein a matrix stored in a memory of the global navigation satellite includes a set of estimated likelihood values for each of a plurality of global navigation satellite system satellites indicating estimated likelihoods that other global navigation satellite system satellites of the plurality of global navigation satellite system satellites are in view of the global navigation satellite system receiver when each of the plurality of global navigation satellite system satellites is in view;

when the candidate satellite is not determined to be in view of the global navigation satellite system receiver, inverting each of the estimated likelihood values within the matrix;

adjusting the estimated likelihood value for the candidate satellite to flag the candidate satellite as already searched; and setting a satellite of the plurality of global navigation satellite system satellites having a maximum estimated likelihood value as the next candidate satellite.

7. The method of claim 6, further comprising:
generating the matrix including the estimated likelihood values for each of the plurality of global navigation satellite system satellites prior to determining whether the candidate satellite is in view of the global navigation satellite system receiver.

8. The method of claim 6, wherein the estimated likelihood values are based on average distances between the plurality of global navigation satellite system satellites over a time period.

9. The method of claim 6, wherein the estimated likelihood values are based on average distances between the plurality of global navigation satellite system satellites over an orbital period.

10. The global navigation satellite system receiver of claim 9, wherein the average distances between the plurality of global navigation satellite system satellites were previously determined by computing positions of the plurality of global navigation satellite system satellites at time intervals over the orbital period.

11. A global navigation satellite system receiver comprising:
a radio frequency front end communicatively coupled to an antenna and configured to receive radio frequency signals from in-view satellites from a plurality of satellites;
a memory;
a processor configured to determine an average distance between each individual satellite in the plurality of satellites and every other satellite in the plurality of satellites over a time period;
wherein the processor is further configured to generate a set of estimated likelihood values for each of the plurality of satellites based on the average distance between each individual satellite in the plurality of satellites and every other satellite in the plurality of satellites over the time period, wherein the set of estimated likelihood values are stored in the memory, wherein the estimated likelihood values indicates estimated likelihoods that other satellites of the plurality of satellites are in view of the global navigation satellite system receiver when each of the plurality of satellites is in view;
wherein the processor is further configured to update the set of estimated likelihood values to flag a satellite as already search when a candidate satellite of the plurality of global navigation satellite system satellites is determined to be in view of the global navigation satellite system; and
wherein the processor is further configured to invert each of the estimated likelihood values within the set of estimated likelihood values when the candidate satellite is not determined to be in view of the global navigation satellite system receiver.

12. The global navigation satellite system receiver of claim 11, wherein the estimated likelihood values are based on average distances between the plurality of satellites over a time period.

13. The global navigation satellite system receiver of claim 11, wherein the estimated likelihood values are based on average distances between the plurality of satellites over an orbital period.

14. The global navigation satellite system receiver of claim 13, wherein the average distances between the plurality of satellites were previously determined by computing positions of the plurality of satellites at time intervals over the orbital period.

* * * * *